United States Patent
Beev et al.

(10) Patent No.: US 12,234,961 B2
(45) Date of Patent: Feb. 25, 2025

(54) LIGHTING DEVICE FOR A VEHICLE, COMPRISING A SCREEN HAVING A MASKING PART AND A TRANSPARENT PART

(71) Applicant: VALEO VISION, Bobigny (FR)

(72) Inventors: Kostadin Beev, Bobigny (FR); Anthony Lozano, Bobigny (FR); Stephanie Bergerat, Bobigny (FR); Hui Jin, Bobigny (FR); Thomas Dufils, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/555,417

(22) PCT Filed: Apr. 5, 2022

(86) PCT No.: PCT/EP2022/059022
§ 371 (c)(1),
(2) Date: Oct. 13, 2023

(87) PCT Pub. No.: WO2022/218764
PCT Pub. Date: Oct. 20, 2022

(65) Prior Publication Data
US 2024/0191857 A1    Jun. 13, 2024

(30) Foreign Application Priority Data
Apr. 13, 2021   (FR) ........................................ 2103817

(51) Int. Cl.
*F21S 41/40*   (2018.01)
*F21W 107/10*  (2018.01)

(52) U.S. Cl.
CPC .......... *F21S 41/40* (2018.01); *F21W 2107/10* (2018.01)

(58) Field of Classification Search
CPC ............................ F21S 41/40; F21W 2107/10
See application file for complete search history.

(56) References Cited

U.S. PATENT DOCUMENTS 6,416,209 B1    7/2002  Abbott

FOREIGN PATENT DOCUMENTS

| DE | 102017006693 A1 | 1/2018 |
|----|-----------------|--------|
| EP | 3483499 A1      | 5/2019 |
| FR | 2794218 A1      | 12/2000 |
| FR | 2861640 A1      | 5/2005 |
| FR | 3014787 A1      | 5/2015 |
| FR | 3016578 A1      | 7/2015 |

(Continued)

OTHER PUBLICATIONS

European Patent Office, International Search Report (with English translation) and Written Opinion of corresponding International Application No. PCT/EP2022/059022, dated Jul. 4, 2022.

*Primary Examiner* — Elmito Breval
(74) *Attorney, Agent, or Firm* — Valeo Vision

(57) ABSTRACT

The invention relates to a lighting device for a vehicle, with the lighting device being configured to carry out at least one lighting function and including at least one optical module, and a screen arranged facing the optical module, with the screen including at least two elements that are arranged relative to one another to form an upper part and a lower part of the screen, the upper part being configured to mask the ambient light coming from outside the vehicle, and the lower part being configured to transmit the ambient light.

7 Claims, 5 Drawing Sheets

(56) References Cited

FOREIGN PATENT DOCUMENTS

| FR | 3074566 | A1 | 6/2019 |
|----|---------|----|--------|
| JP | 2014120349 | A | 6/2014 |
| WO | 0128744 | A1 | 4/2001 |

CSF1:0.1cd/m²
CSF2:1cd/m²
CSF3:10cd/m²
CSF4:100cd/m²
CSF5:1000cd/m²

ND A TRANSPARENT
LIGHTING DEVICE FOR A VEHICLE, COMPRISING A SCREEN HAVING A MASKING PART AND A TRANSPARENT PART

TECHNICAL FIELD

The present invention relates to a luminous device for a vehicle, said device being configured to carry out at least one luminous function. The present invention is applicable in particular, but without limitation, in smart electric motor vehicles.

BACKGROUND OF THE INVENTION

Smart electric vehicles require less space at the front for air intakes, but in contrast enhanced luminous functions are required for semi-autonomous or autonomous driving. Therefore, there is a growing interest in integrating "light" into large zones at the front and rear or sides of the vehicle, with a view to obtaining improved signaling and/or communication and to providing new enhanced vehicle luminous functions. There is a particular need to have an individually controllable signature line in order to carry out a regulatory luminous function and/or an enhanced luminous function, and/or a style function. In terms of style, there is often a need on the part of manufacturers to have black opaque front or rear panels (called black panels) and to integrate the luminous device into these panels so that, in switched-off mode, it is not possible to distinguish the internal elements of the luminous device, and that, in switched-on mode, there is a better contrast for said luminous function, in particular if it relates to an enhanced luminous function for communication with pedestrians, or a style feature such as a given light signature or a welcome scenario.

One example known to those skilled in the art of a vehicle luminous device configured to carry out at least one luminous function comprises:
  at least one optical module comprising at least one light source, and
  a mask surrounding said optical module, and
  a tinted screen arranged facing said optical module, said screen being configured to transmit a light beam resulting from light rays from said at least one light source of said lighting module to the outside of said vehicle and to stop ambient light coming from outside the vehicle so that it does not illuminate the internal elements of the luminous device. Thus, in switched-off mode, it is no longer possible to distinguish the optical module from the mask.

In order to carry out said at least one luminous function, said at least one light source is activated or the various light sources are activated selectively or at the same time.

One drawback of this prior art is that such a luminous device degrades the luminous function or the luminous functions carried out by the luminous device. Indeed, the tinted screen in switched-on mode transmits the light beam to the outside only to an extent of between 10% and 70%.

BRIEF SUMMARY OF THE INVENTION

In this context, the present invention aims to provide a luminous device that makes it possible to overcome the stated drawback.

To this end, the invention proposes a luminous device for a vehicle, said luminous device being configured to carry out at least one luminous function and comprising at least one optical module and a screen arranged facing said optical module, characterized in that said screen comprises at least two elements that are arranged with respect to one another so as to form an upper part and a lower part of said screen, said upper part being configured to mask ambient light coming from outside said vehicle, and said lower part being configured to transmit said ambient light. Ambient light is transmitted from the outside to the inside of the luminous device.

According to some non-limiting embodiments, said luminous device may furthermore comprise one or more of the following additional features, taken alone or in any technically possible combination.

According to one non-limiting embodiment, said optical module is configured to generate a light beam, and said upper part is configured to mask said light beam, and said lower part is configured to transmit said light beam. Said light beam is transmitted from the inside to the outside of the luminous device.

According to one non-limiting embodiment, the masking effect of said upper part is partial or total.

According to one non-limiting embodiment, said screen comprises a primary element made of crystal plastic material.

According to one non-limiting embodiment, said screen comprises a secondary element made of smoked or opaque plastic material.

According to one non-limiting embodiment, said primary element and said secondary element are adjacent at one of their ends.

According to one non-limiting embodiment, said primary element and said secondary element are adjacent along their lengths.

According to one non-limiting embodiment, said secondary element has a length less than that of said primary element.

According to one non-limiting embodiment, said primary element and said secondary element have substantially equal lengths and have variable thicknesses, the thickness of said primary element varying inversely to the thickness of said secondary element, such that said screen has variable transmission for said ambient light.

According to one non-limiting embodiment, said screen comprises a secondary element that forms a film having variable transmission for said ambient light, said film being arranged on said primary part.

According to one non-limiting embodiment, said film is arranged on the outside of said luminous device or on the inside of said luminous device.

According to one non-limiting embodiment, said screen furthermore comprises a tertiary element made of opaque or dark smoked material, said primary element and said tertiary element being adjacent to one another at one of their ends and adjacent to said secondary element along their lengths.

According to one non-limiting embodiment, said optical module is arranged facing said screen, such that said light beam passes mainly through said lower part of said screen.

According to one non-limiting embodiment, said luminous device furthermore comprises a mask surrounding said optical module.

BRIEF DESCRIPTION OF THE DRAWINGS

The invention and its various applications will be better understood on reading the following description and on examining the figures accompanying it.

DETAILED DESCRIPTION OF THE INVENTION

Elements that are identical in terms of structure or function and that appear across various figures retain the same references, unless indicated otherwise.

The luminous device 1, according to the invention, for a vehicle 2 is described with reference to FIGS. 1 to 9. In one non-limiting embodiment, the vehicle 2 is a motor vehicle. A motor vehicle is understood to mean any type of motorized vehicle. This embodiment is taken as a non-limiting example in the remainder of the description. In the remainder of the description, the vehicle 2 is thus otherwise called a motor vehicle 2. In one non-limiting variant embodiment, the vehicle 2 is a semi-autonomous or autonomous electric vehicle.

The luminous device 1 is configured to carry out at least one luminous function F. The luminous function F is either regulatory or not. Thus, in some non-limiting embodiments, said at least one luminous function F is a regulatory function (such as an illumination function or a signaling function), or a style luminous function, or an enhanced luminous function (for communication with pedestrians for example). In some non-limiting examples, the luminous function is a high beam or a low beam. In some non-limiting examples, the signaling function is a daytime running light DRL, a parking lamp PL, a position light T (tail light), a turn indicator TI, a side marker SM, a stop lamp STP, a reverse light R, a fog lamp FG, a third stop light CHSML (center high-mount stop light). In some non-limiting examples, the style luminous function is a light signature, a welcome scenario, a decorative luminous function, a side lighting display function. In one non-limiting example, the enhanced luminous function is a function of displaying a pictogram. In one non-limiting embodiment, the luminous device 1 is configured to carry out a plurality of luminous functions F. The luminous device 1 may be integrated at the front, at the rear or on the sides of the motor vehicle 2.

Figure 1:
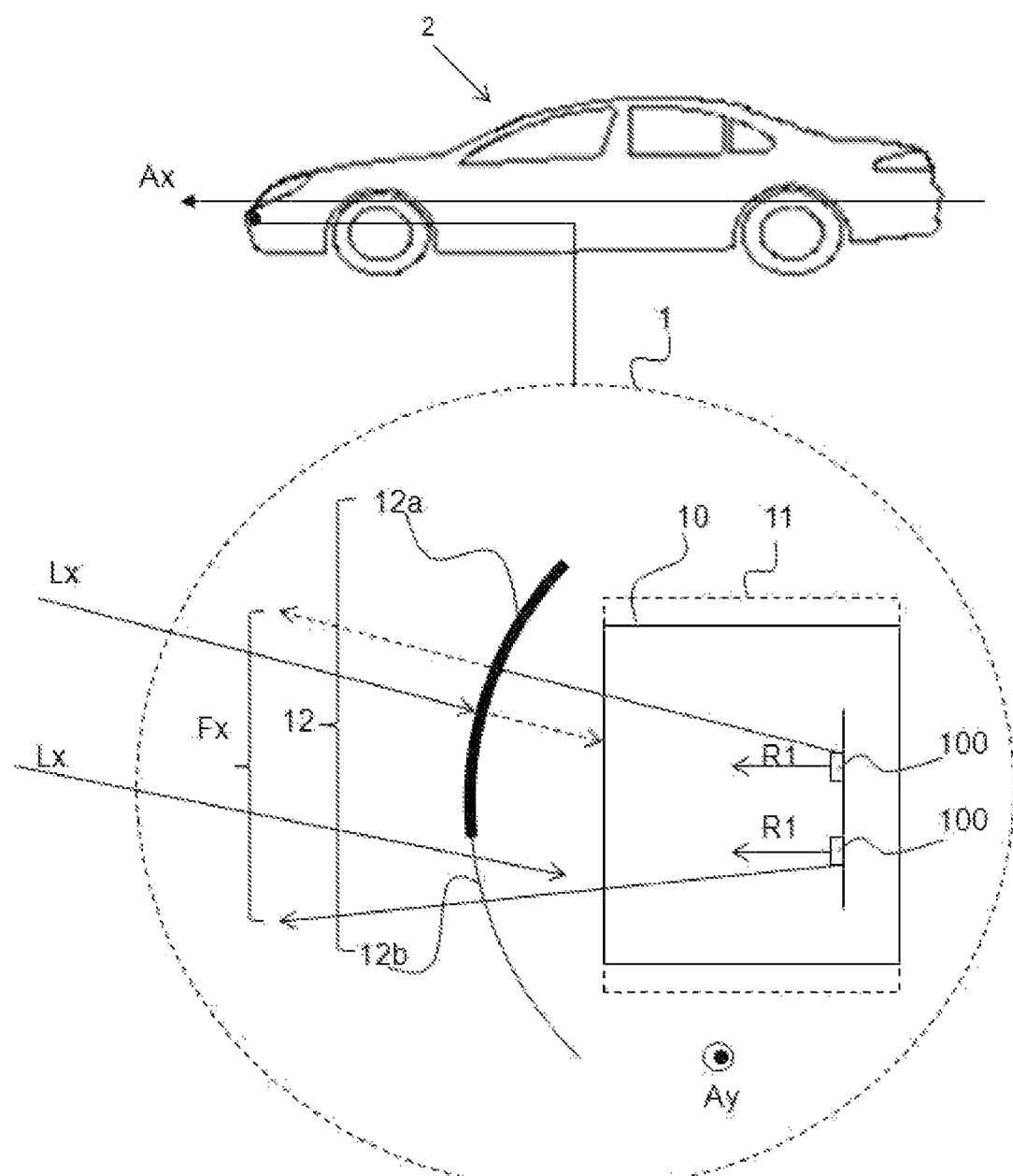
FIG. 1 is a schematic view of a luminous device for a vehicle, said luminous device comprising an optical module, a mask, and a screen, according to one non-limiting embodiment of the invention.

As illustrated in FIG. 1, the luminous device 1 for a vehicle 2 comprises:
 an optical module 10 with at least one light source 100, and
 a screen 12.

In one non-limiting embodiment, the luminous device 1 furthermore comprises a mask 11. The mask 11 surrounds the optical module 10. This is illustrated in dotted lines in FIG. 1 because it extends along an axis Ay perpendicular to the vehicle axis Ax. The mask 11 that surrounds the optical module 10 is a decorative mask. It is otherwise called a bezel.

In one non-limiting embodiment, said optical module 10 comprises a plurality of light sources 100. This non-limiting embodiment will be considered, by way of non-limiting example, in the remainder of the description. Only two light sources 100 have been shown in FIG. 1.

The optical module 10 generates, by virtue of the light sources 100, a light beam Fx that is transmitted in the direction of the screen 12 toward the outside of the motor vehicle 2. A light source 11 emits light. It is thus configured to emit light rays R1 (illustrated in FIG. 1) so as to form said light beam Fx. When there are a plurality of light sources 100, these may be activated selectively or at the same time. They may thus be switched on independently of one another. This makes it possible to reinforce the perception of the desired luminous function F. In the non-limiting example of FIG. 1, when the luminous device 1 is arranged at the front or at the rear of the motor vehicle 2, the light rays R1 are mostly transmitted in the direction of the vehicle axis Ax or in the opposite direction to the vehicle axis Ax, respectively. In another non-limiting example, not illustrated, when the luminous device 1 is arranged on one side of the motor vehicle 2, the light rays R1 are mostly transmitted in a direction perpendicular to the vehicle axis Ax, in the direction of the axis Ay or in the opposite direction to the axis Ay.

In one non-limiting embodiment, the light sources 100 are semiconductor-based light sources. In one non-limiting embodiment, a semiconductor-based light source forms part of a light-emitting diode. A light-emitting diode is understood to mean any type of light-emitting diode, such as, to give non-limiting examples, standard LEDs (light-emitting diodes), OLEDs (organic LEDs), AMOLEDs (active-matrix-organic LEDs), FOLEDs (flexible OLEDs), RGB diodes or multi-chip diodes.

As illustrated in FIGS. 2 to 7, the screen 12 comprises at least two elements 120, 121 that are structural elements. Said at least two elements 120, 121 are arranged with respect to one another so as to form an upper part 12a and a lower part 12b of said screen 12. In one non-limiting embodiment, the screen 12 comprises two elements 120, 121. In another non-limiting embodiment, it comprises more than two elements 120, 121.

As will be seen hereinafter, the upper part 12a locally masks ambient light Lx coming from the outside, whether completely or partially, or in a variable manner, namely it does not transmit ambient light Lx at all, or does so only partially, toward the inside of the luminous device 1, or does so progressively. With regard to the lower part 12b, this is transparent to said ambient light Lx, namely it transmits ambient light Lx toward the inside of the luminous device 1 almost completely or in a variable manner.

In the same way, the upper part 12a masks the light beam Fx generated by the light sources 100, whether completely, partially or in a variable manner, namely it does not transmit the light beam Fx at all, or does so only partially, toward the outside of the luminous device 1, or does so progressively. With regard to the lower part 12b, this is transparent to said light beam Fx, namely it transmits the light beam Fx toward the outside of the luminous device 1 almost completely or in a variable manner.

The screen 12 is described according to various non-limiting embodiments below.

Figure 2:
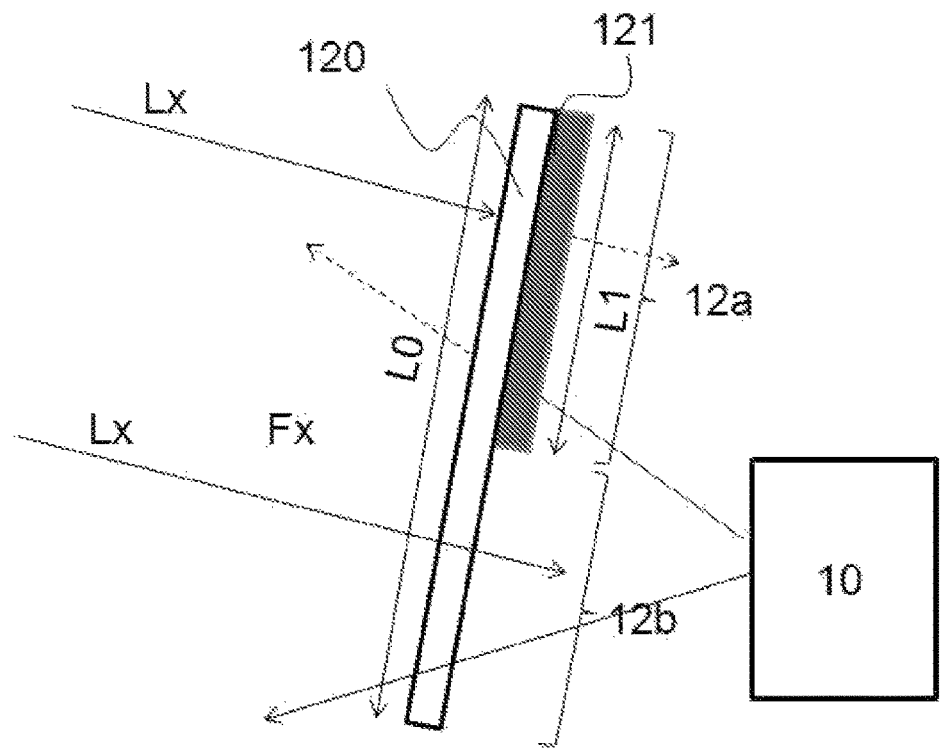
FIG. 2 is a schematic profile view of the screen of said luminous device of FIG. 1, according to a first non-limiting embodiment.

According to a first non-limiting embodiment illustrated in FIG. 2, the screen 12 comprises two elements 120, 121, namely a primary element 120 made of a crystal plastic material and a secondary element 121 made of a dark smoked or opaque plastic material. As illustrated, the primary element 120 and the secondary element 121 are adjacent along their lengths L0, L1 and the secondary element 121 has a length L1 less than that L0 of the primary element 120. In one non-limiting embodiment, its length L1 is substantially equal to half the length L0. The length L0 represents the height of the screen 12. The upper part 12a of the screen 12 is thus formed by one part (what is known as the top part) of the primary element 120 and by the secondary element 121; whereas the lower part 12b of the screen is formed only by the other part (what is known as the bottom part) of the primary element 120. Since the primary element 120 is made of crystal, it transmits ambient light Lx to an extent of more than 90% toward the inside of the luminous device 1 in one non-limiting embodiment. Since the secondary element 121 is opaque or dark smoked, it does not allow the light beam Fx to pass at all (when it is opaque), or allows it to pass only partially (when it is dark smoked), namely to an extent of less than 60% in one non-limiting embodiment, for example of 10% in one non-limiting example.

Since the material of the secondary element 121 is opaque or dark smoked, the upper part 12a will completely or partially mask ambient light Lx coming from outside the motor vehicle 2. The upper part 12a thus masks ambient light Lx. Since the material of the primary element 120 is made of crystal, the lower part 12b will allow ambient light Lx to pass and thus transmit it toward the inside of the luminous device 1. The lower part 12b is thus transparent to ambient light Lx.

For the same reasons, the upper part 12a will totally or partially mask the light beam Fx generated by the light sources 100 of the optical module 10. Said light beam will be stopped by the screen 12 at the upper part 12a thereof. The upper part 12a thus masks the light beam Fx; whereas the lower part 12b will allow the light beam Fx to pass toward the outside of the luminous device 1. Said light beam will pass through the screen 12 at the lower part 12b thereof. The lower part 12b is thus transparent to the light beam Fx.

Figure 3:
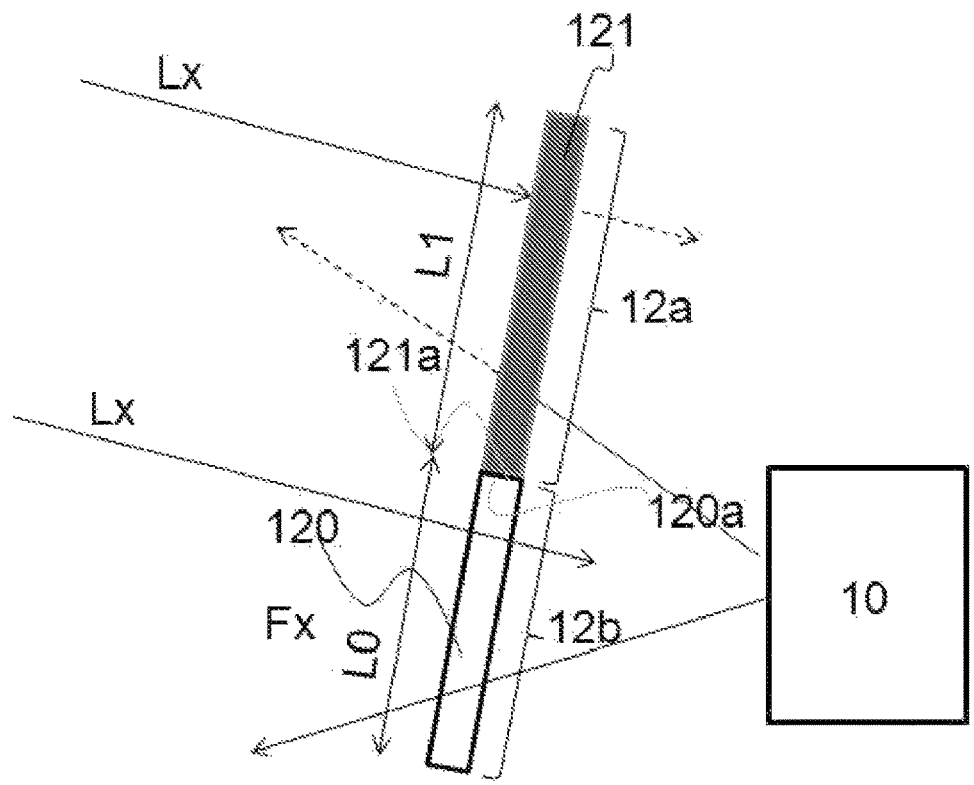
FIG. 3 is a schematic profile view of the screen of said luminous device of FIG. 1, according to a second non-limiting embodiment.

According to a second non-limiting embodiment illustrated in FIG. 3, the screen 12 comprises two elements 120, 121, namely a primary element 120 made of a crystal plastic material and a secondary element 121 made of a dark smoked or opaque plastic material. As illustrated, the primary element 120 and the secondary element 121 are adjacent at one of their ends 120a, 121a. In one non-limiting embodiment, the primary element 120 and the secondary element 121 have substantially equal lengths L0, L1. The sum of the lengths L0, L1 represents the height of the screen 12. The upper part 12a of the screen 12 is thus formed by the secondary element 121 alone, and the lower part 12b of the screen 12 is formed by the primary element 120 alone. Since the primary element 120 is made of crystal, it transmits ambient light Lx to an extent of more than 90% toward the inside of the luminous device 1 in one non-limiting embodiment. Since the secondary element 121 is opaque or dark smoked, it does not allow the light beam Fx to pass at all (when it is opaque), or allows it to pass only partially (when it is dark smoked), namely to an extent of less than 60% in one non-limiting embodiment, for example of 10% in one non-limiting example.

Since the material of the secondary element 121 is opaque or dark smoked, the upper part 12a will completely or partially mask ambient light Lx coming from outside the motor vehicle 2. The upper part 12a thus masks ambient light Lx. Since the material of the primary element 120 is made of crystal, the lower part 12b will allow ambient light Lx to pass and thus transmit it toward the inside of the motor vehicle 2. The lower part 12b is thus transparent to ambient light Lx.

For the same reasons, the upper part 12a will totally or partially mask the light beam Fx generated by the light sources 100 of the optical module 10. Said light beam will be stopped by the screen 12 at the upper part 12a thereof. The upper part 12a thus masks the light beam Fx; whereas the lower part 12b will allow the light beam Fx to pass toward the outside of the luminous device 1. Said light beam will pass through the screen 12 at the lower part 12b thereof. The lower part 12b is thus transparent to the light beam Fx.

For the two non-limiting embodiments described above, in some non-limiting embodiments, the material of the screen 12 is PMMA (polymethyl methacrylate) or PC (polycarbonate), whether for the primary element 120 or the secondary element 121. Furthermore, for these two non-limiting embodiments described above, in one non-limiting embodiment, the screen 12 is produced by bi-injection.

Figure 4:
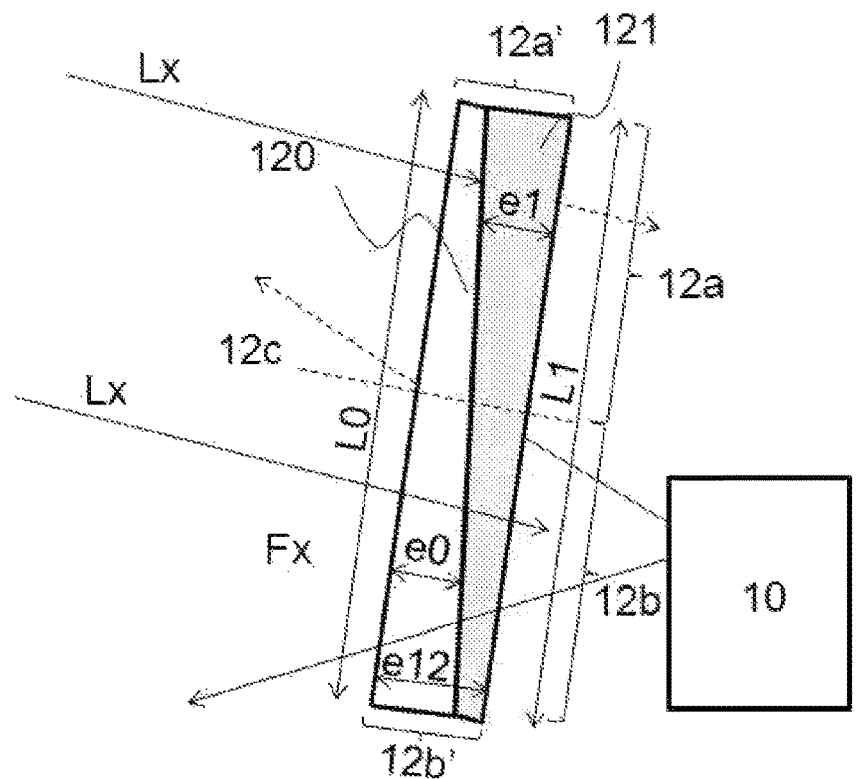
FIG. 4 is a schematic profile view of the screen of said luminous device of FIG. 1, according to a third non-limiting embodiment.

According to a third non-limiting embodiment illustrated in FIG. 4, the screen 12 comprises two elements 120, 121, namely a primary element 120 made of a crystal plastic material and a secondary element made of a smoked plastic material. As illustrated, the primary element 120 and the secondary element 121 are adjacent along their lengths L0, L1. In addition, the primary element 120 and the secondary element 121 have substantially equal lengths L0, L1. The lengths L0, L1 represent the height of the screen 12. The upper part 12a of the screen 12 is thus formed by one part (what is known as the top part) of the primary element 120 and by one part (what is known as the top part) of the secondary element 121, whereas the lower part 12b of the screen 12 is thus formed by the other part (what is known as the bottom part) of the primary element 120 and by the other part (what is known as the bottom part) of the secondary element 121.

Moreover, the primary element 120 and the secondary element 121 have variable respective thicknesses e0, e1 and the thickness e0 of the primary element 120 varies inversely to the thickness e1 of the secondary element 121, such that the screen 12 has variable transmission for said ambient light Lx and for said light beam Fx. It may be seen that, when the thickness e0 is small, the thickness e1 is large, whereas when the thickness e0 is large, the thickness e1 is small. The thickness e0 and the thickness e1 form a constant total thickness e12, which is thus the thickness of the screen 12. At the boundary 12c between the upper part 12a and the lower part 12b, the two thicknesses e0, e1 are substantially equal. At the upper part 12a, the thickness e1 is mainly greater than the thickness e0, whereas at the lower part 12b, it is the thickness e0 that is mainly greater than the thickness e1.

Since the thicknesses e0 and e1 are variable, the screen 12 will mask and transmit ambient light Lx, coming from outside the motor vehicle 2, in a variable manner. Reference is thus made to a screen 12 having variable transmission. In one non-limiting example, the transmission varies from 90% to 10%. In particular, the upper part 12a progressively masks ambient light Lx, whereas the lower part 12b progressively transmits ambient light Lx. The progression takes place along the height of the screen 12. The further one moves away from the boundary 12c to move toward the end 12a' of the upper part 12a, the more the upper part 12a masks ambient light Lx that arrives locally on the screen 12. On the other hand, the further one moves away from the boundary 12c to move toward the end 12b' of the lower part 12b, the more the lower part 12b transmits ambient light Lx that arrives locally on the screen 12.

Thus, on the side of the upper part 12a, the masking is greater toward the end 12a' of the upper part 12a, whereas the masking is lower toward the boundary 12c. Ambient light Lx that arrives locally toward the top of the upper part 12a, which is close to the end 12a', will be masked more than ambient light Lx that arrives locally toward the bottom of the upper part 12a, which is close to the boundary 12c, which will be masked but to a lesser extent.

Moreover, on the side of the lower part 12b, the transmission is greater toward the end 12b' of the lower part 12b, whereas the transmission is lower toward the boundary 12c. Thus, toward the end 12b' of the lower part 12b, the lower part 12b is more transparent than toward the boundary 12c. Ambient light Lx that arrives locally toward the bottom of the lower part 12b, which is close to the end 12b', will thus be transmitted more than ambient light Lx that arrives locally toward the top of the lower part 12b, which is close to the boundary 12c, which will be transmitted toward the inside of the luminous device 1 but to a lesser extent.

Thus, when moving from the end 12b' of the lower part 12b toward the end 12a' of the upper part 12a, there is a change from a minimum masking effect to a maximum masking effect of the screen 12. Conversely, when moving from the end 12a' of the upper part 12a toward the end 12b' of the lower part 12b, there is a change from minimum transparency to maximum transparency of the screen 12.

For the same reasons, the upper part 12a will progressively mask the light beam Fx generated by the optical module 10. Said light beam will be progressively stopped by the screen 12 at the upper part 12a thereof. And the lower part 12b will progressively transmit the light beam Fx toward the outside of the luminous device 1. Said light beam will be progressively transmitted by the screen 12 at the lower part 12b thereof.

For this third non-limiting embodiment, in one non-limiting embodiment, the screen 12 is produced by bi-injection with two injections of variable thicknesses so as to produce the primary element 120 and the secondary element 121.

Figure 5:
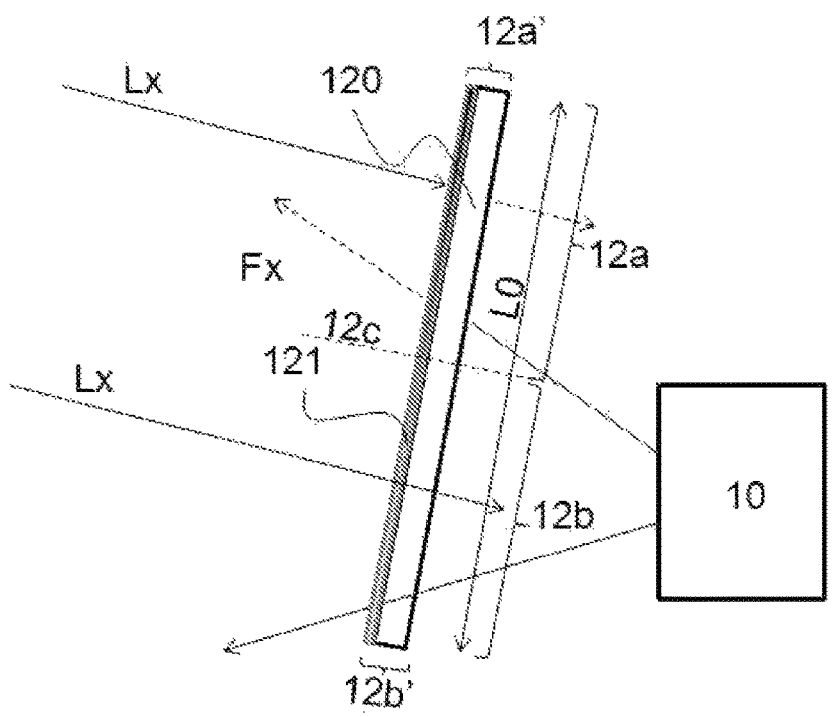
FIG. 5 is a schematic profile view of the screen of said luminous device of FIG. 1, according to a first non-limiting variant embodiment of a fourth non-limiting embodiment.
Figure 6:
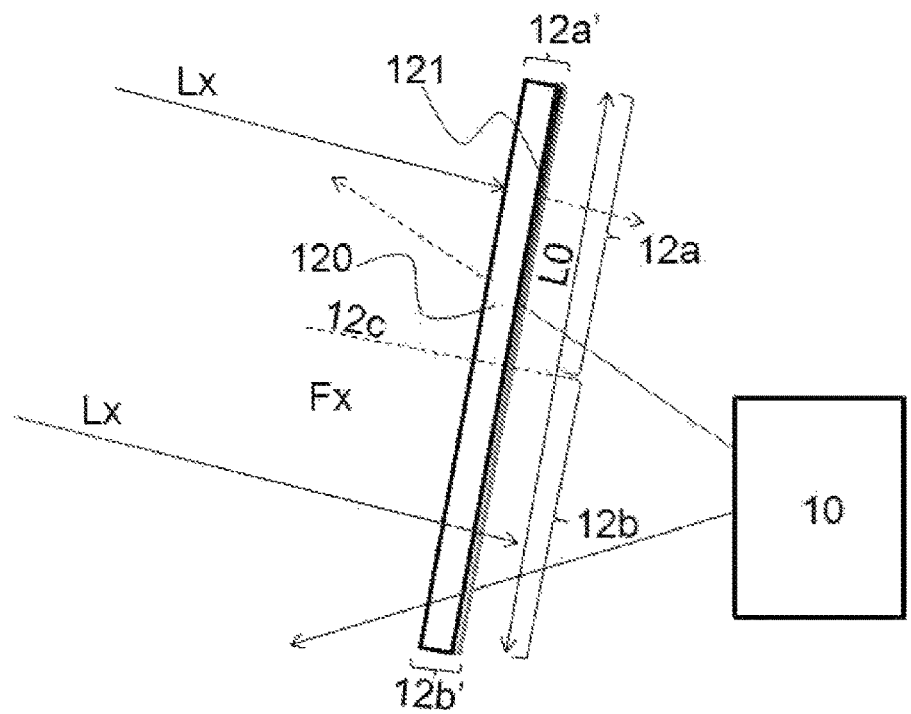
FIG. 6 is a schematic profile view of the screen of said luminous device of FIG. 1, according to a second non-limiting variant embodiment of a fourth non-limiting embodiment.

According to a fourth non-limiting embodiment illustrated in FIGS. 5 and 6, the screen 12 comprises two elements 120, 121, namely a primary element 120 made of a crystal plastic material and a secondary element 121 that forms a film having variable transmission. The film 121 is arranged on the primary part 120. The screen 12 thus has variable transmission for said ambient light Lx and for said light beam Fx. In one non-limiting example, the transmission varies from 90% to 10%.

In the same way as for the third non-limiting embodiment, the upper part 12a progressively masks ambient light Lx, whereas the lower part 12b progressively transmits ambient light Lx. The progression takes place along the height L0 of the screen 12. The further one moves away from the boundary 12c to move toward the end 12a' of the upper part 12a, the more the upper part 12a masks ambient light Lx that arrives locally on the screen 12. On the other hand, the further one moves away from the boundary 12c to move toward the end 12b' of the lower part 12b, the more the lower part 12b transmits ambient light Lx that arrives locally on the screen 12.

Thus, on the side of the upper part 12a, the masking is greater toward the end 12a' of the upper part 12a, whereas the masking is lower toward the boundary 12c. Ambient light Lx that arrives locally toward the top of the upper part 12a, which is close to the end 12a', will be masked more than ambient light Lx that arrives locally toward the bottom of the upper part 12a, which is close to the boundary 12c, which will be masked but to a lesser extent.

Moreover, on the side of the lower part 12b, the transparency is greater toward the end 12b' of the lower part 12b, whereas the transparency is lower toward the boundary 12c. Ambient light Lx that arrives locally toward the bottom of the lower part 12b, which is close to the end 12b', will be transmitted more than ambient light Lx that arrives locally toward the top of the lower part 12b, which is close to the boundary 12c, which will be transmitted toward the inside of the luminous device 1 but to a lesser extent.

Thus, when moving from the end 12b' of the lower part 12b toward the end 12a' of the upper part 12a, there is a change from a minimum masking effect to a maximum masking effect of the screen 12. Conversely, when moving from the end 12a' of the upper part 12a toward the end 12b' of the lower part 12b, there is a change from minimum transparency to maximum transparency of the screen 12.

For the same reasons, the upper part 12a will progressively mask the light beam Fx generated by the optical module 10. Said light beam will be progressively stopped by the screen 12 at the upper part 12a thereof. And the lower part 12b will progressively transmit the light beam Fx toward the outside of the luminous device 1. Said light beam will be progressively transmitted by the screen 12 at the lower part 12b thereof.

According to this fourth non-limiting embodiment, in some non-limiting variant embodiments, the film 121 extends along the entire surface of the primary element 120 or partially along the surface of the primary element 120. In one non-limiting embodiment, the film 121 is bonded to the primary part 120. In another non-limiting embodiment, the film 121 is overmolded onto the primary part 120. In order to achieve the variable transmission, in one non-limiting embodiment, a deposit of black ink that is a function of the transmission is deposited on the film 121. The more ink there is and/or the higher the density of the pigments, the greater the masking effect of the film 121 will be. The less ink there is and/or the lower the density of the pigments, the more transparent the film 121 will be. Thus, in order to produce a film 121 having variable transmission, said film comprises ink deposits of variable thicknesses on its surface and/or variable pigment densities on its surface.

In a first non-limiting variant embodiment illustrated in FIG. 5, the film 121 is arranged on the outside of said luminous device 1. It is therefore located facing the outside of the motor vehicle 2. In a second non-limiting variant embodiment illustrated in FIG. 6, the film 121 is arranged on the inside of said luminous device 1. It is therefore located facing the optical module 10.

In some non-limiting embodiments, the material of the primary element 120 is PMMA (polymethyl methacrylate) or PC (polycarbonate).

For this fourth non-limiting embodiment, in one non-limiting embodiment, the screen 12 is produced by injecting the primary element 120 and then bonding the film 121 or overmolding the film 121.

Figure 7:
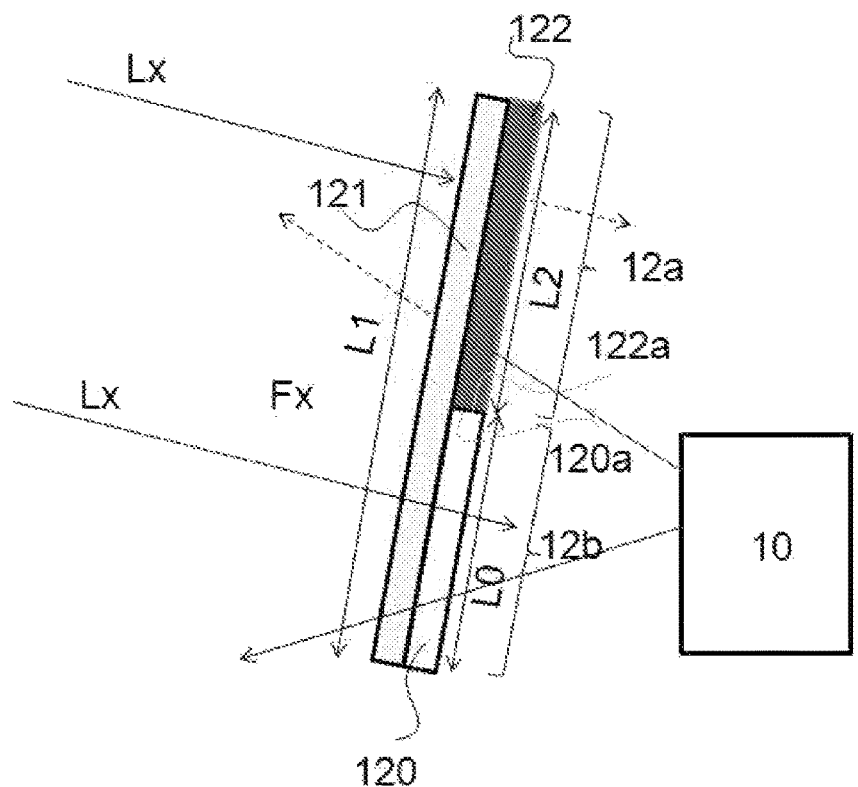
FIG. 7 is a schematic profile view of the screen of said luminous device of FIG. 1, according to a fifth non-limiting embodiment.

According to a fifth non-limiting embodiment illustrated in FIG. 7, the screen 12 comprises three elements 120, 121, 122, namely a primary element 120 made of a crystal plastic material, a secondary element 121 made of a light smoked plastic material (60% to 80% transmission in one non-limiting example), and a tertiary element 122 made of a dark smoked or opaque material (below 60% transmission in one non-limiting example). The dark smoked material allows a semi-opaque state. The primary element 120 and the tertiary element 122 are adjacent to one another at one of their ends 120a, 122a and are both adjacent to the secondary element 121 along their respective lengths L0, L2. In one non-limiting embodiment, the primary element 120 and the tertiary element 122 have substantially equal lengths L0, L2 and the sum of their lengths L0+L2 is equal to the length L1 of the secondary element 121, and therefore to the height of the screen 12.

The upper part 12a is thus formed by one part (what is known as the top part) of the secondary element 121 and by the entire tertiary element 122, whereas the lower part 12b of the screen 12 is thus formed by the other part (what is known as the bottom part) of the secondary element 121 and by the entire primary element 120. Coupling the secondary element 121 to the primary element 120 and the tertiary element 122 makes it possible to precisely define the transmission rate of the upper part 12a and of the lower part 12b with respect to the other embodiments of FIGS. 2 to 6.

Since the primary element 120 is made of crystal, it transmits ambient light Lx to an extent of more than 90% toward the inside of the luminous device 1 in one non-limiting embodiment. Since the secondary element 121 is light smoked, it transmits ambient light Lx to an extent of between 70% and 90% in one non-limiting embodiment. Since the tertiary element 122 is dark smoked or opaque, it transmits ambient light Lx to an extent of only between 10% and 70% in one non-limiting embodiment.

Thus, the upper part 12a (which combines a dark smoked or opaque element and a light smoked element) will mask ambient light Lx coming from outside the motor vehicle 2, whereas the lower part 12b (which combines a crystal element and a light smoked element) will transmit ambient light Lx toward the inside of the luminous device 1. The lower part 12b allows relatively high transmission of ambient light Lx compared to the upper part 12a.

For the same reasons, the upper part 12a will partially mask the light beam Fx generated by the optical module 10. The light beam Fx will be stopped by the screen 12 at the upper part 12a thereof. The upper part 12a thus masks the light beam Fx; whereas the lower part 12b will allow the light beam Fx to pass toward the outside of the luminous device 1. The light beam Fx will pass through the screen 12 at the lower part 12b thereof. The lower part 12b allows relatively high transmission of the light beam Fx compared to the upper part 12a.

For this fifth non-limiting embodiment, in some non-limiting embodiments, the material of the screen 12 is PMMA (polymethyl methacrylate) or PC (polycarbonate), whether for the primary element 120, the secondary element 121 or the tertiary element 122. Furthermore, for this fifth non-limiting embodiment, in one non-limiting embodiment, the screen 12 is produced using an IML (in-mold labeling) or IMD (in-mold decorating) method. In another non-limiting embodiment, the screen 12 is produced by tri-injection.

Thus, according to all of these embodiments presented above, it may be seen that the transmission of ambient light Lx coming from outside the motor vehicle 2 is greatly reduced or even canceled out completely by the upper part 12a of the screen 12 from the outside the motor vehicle 2 toward the inside of the luminous device 1.

Figure 8:
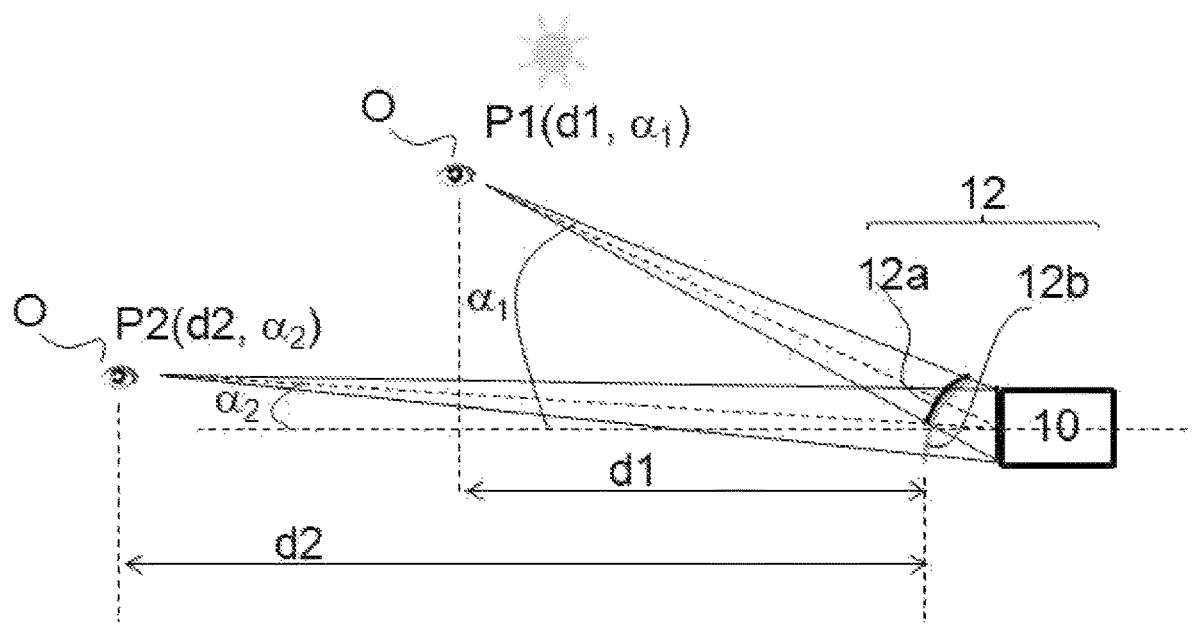
FIG. 8 is a schematic view of the screen of said luminous device according to any one of FIGS. 1 to 7, observed by an observer outside the vehicle, at two different observation angles, according to one non-limiting embodiment.

This means that, in switched-off mode, when the optical module 10 is not activated, that is to say when there is no light beam Fx, an observer O, represented by an eye in FIG. 8, owing to the ambient illumination, referred to as ambient light Lx coming from outside the motor vehicle 2, does not distinguish the optical module 10, the mask 11 or any other element of the luminous device 1 located behind the screen 12.

If the screen 12 is entirely transparent (upper part 12a and lower part 12b are transparent) and when the observer O is close to the luminous device 1, the observer O distinguishes the internal elements of the luminous device 1, that is to say they will distinguish the optical module 10 from the mask 11 in particular. The term close is understood to mean that the observer O is located between 1 meter and 3 meters from the motor vehicle 2 and therefore from the luminous device 1, this corresponding to an observation angle α of between 20° and 48°. It should be noted that the observation angle α is the horizontal straight line passing through the middle of the screen 12 and the straight line passing through the eye of the observer O. On the other hand, when the screen 12 has a partially masking effect by virtue of the upper part 2a, which transmits light Lx very little or not at all (as described above according to the various non-limiting embodiments), when the observer O is close to the luminous device 1, they will no longer distinguish the internal elements of the luminous device 1 in switched-off mode. As illustrated in FIG. 8, the observer O, who is located at the position P1 with a distance d1 from the luminous device 1 and at an observation angle α1, is close to the luminous device 1.

Figure 9:
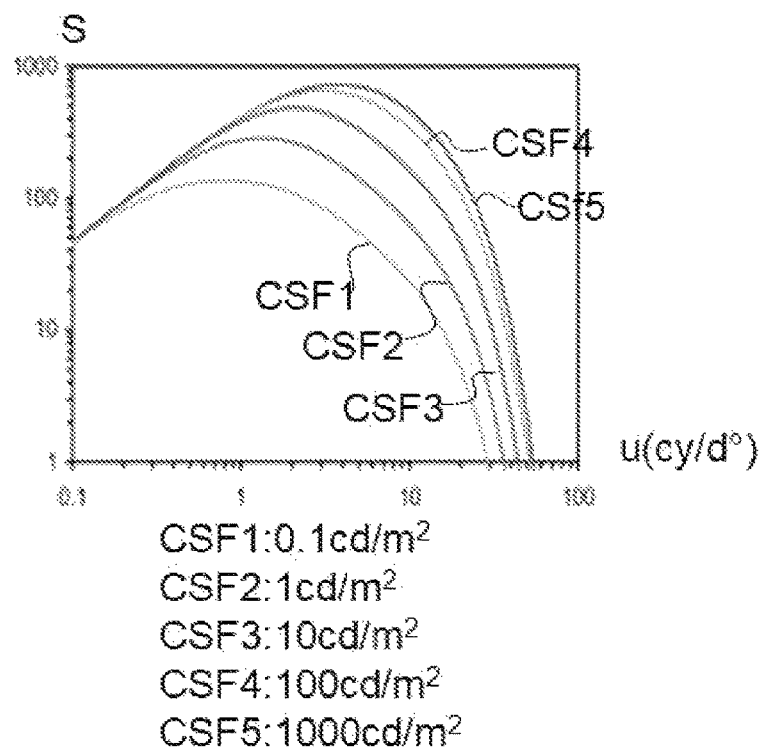
FIG. 9 is a set of curves of the contrast sensitivity of an eye of an observer observing said luminous device according to one of FIGS. 1 to 7 from outside the vehicle.

The set of Barten curves in FIG. 9 illustrates contrast sensitivity curves CSF. The set of curves illustrates five curves CSF1 to CSF5 that illustrate contrast sensitivities of the eye, for five different brightness levels that represent various adaptation luminance of the eye, the five curves CSF1 to CSF5 having a ratio of 10 with respect to one another. The curves CSF1 to CSF5 thus relate to respective sensitivity threshold values S of 0.1, 1, 10, 100 and 1000 candela per m2. The sensitivity threshold S is otherwise called contrast sensitivity S. The spatial frequency u in cycles per degree (cpd) is plotted on the abscissa, and the sensitivity threshold S, that is to say the reciprocal of the value of the lowest contrast able to be detected at the frequency under consideration, is plotted on the ordinate. The spatial frequency u corresponds to the angular size of the object observed by the eye. Thus, in one non-limiting example, if the optical module 10 is 10 mm in size, the angular size corresponds to a spatial frequency u of 1.7 cpd at a distance of 1 m. At 10 meters, the angular size corresponds to 17 cpd, and at 25 m, it corresponds to 43 cpd.

The closer one moves toward the motor vehicle 2 and therefore toward the luminous device 1, the more one moves toward a smaller spatial frequency u. Thus, in one non-limiting example, the spatial frequency u will go from 5 cpd and 1.7 cpd for an object with a size of 10 mm. This corresponds to an observation angle α of between 20° and 48°. When moving toward the luminous device 1, there is thus a movement from right to left on the set of Barten curves. Thus, the smaller the spatial frequency u, the better the internal elements of the light device 1 may be seen, that is to say the greater the contrast sensitivity S between the screen 12 and the internal elements of the luminous device 1. In this case, the contrast sensitivity S of the eye increases.

Thus, the closer the observer O is to the motor vehicle 2 and therefore to the luminous device 1, the more the contrast sensitivity S of the eye increases. They will therefore distinguish the internal elements of the luminous device 1 better if the screen 12 is totally transparent, in particular if the upper part 12a thereof is transparent. Indeed, when the observer O is close to the luminous device 1, their observation angle α will be such that they will see the internal elements of the luminous device 1 mainly through the upper part 12a of the screen 12. Their perception of the contrast between the internal elements of the luminous device 1 will be significant, the contrast representing a difference in luminance that may be expressed by (Lmax−Lmin)/(Lmax+Lmin), with Lmax the luminance of the optical module 10 in switched-off mode and Lmin the luminance of the mask 11 in switched-off mode in one non-limiting embodiment.

In order that the observer O who is close to the luminous device 1 does not distinguish the internal elements of the luminous device 1, it is possible to act locally on the luminance level by lowering local ambient light Lx at the screen 12 of the luminous device 1, and in particular at the upper part 12a thereof. There will thus be a change from a curve CSF with a higher brightness level to a curve CSF with a lower brightness level. There will thus be a movement from right to left in the set of curves. Lowering ambient light Lx reduces the luminance level. The contrast sensitivity S is thus reduced. Thus, in the set of curves of FIG. 9, for one and the same spatial frequency u, for example 10 cpd, it may be seen that the contrast sensitivity S decreases when local ambient light Lx is reduced, that is to say the contrast between the internal elements of the luminous device 1 (between the optical module 10 and the mask 11 in particular) through the screen 12 will be less perceptible to the eye, even though said contrast may be the same.

Local ambient light Lx is reduced with the upper part 12a of the screen 12, according to the various embodiments described above. Since the upper part 12a of the screen 12 has a partially or totally masking effect, it will limit the amount of ambient light Lx that enters the luminous device 1 via the screen 12.

On the other hand, the further away one moves from the motor vehicle 2 and therefore from the luminous device 1, the more one moves toward a spatial frequency u that goes beyond 10 cpd so as to reach up to 60 cpd. This corresponds to an observation angle α that approaches 0°. As illustrated in FIG. 8, the observer O, who is located at the position P2 with a distance d2 greater than the distance d1 and at an observation angle α2 less than the observation angle α1, is far from the luminous device 1. When the observer O is far from the luminous device 1, their observation angle α will be such that they will see the internal elements of the luminous device 1 mainly through the lower part 12b of the screen 12. It should be noted that the observer at the position P2 may be at the same height as the observer at the position P1, but their distance d2 is much greater than the distance d1.

When taking distance, there is a movement to the right in the set of Barten curves. On the right, the contrast sensitivity S of the eye decreases greatly. Thus, the greater the spatial frequency u, the more difficult it is to distinguish the internal elements of the luminous device 1, that is to say the less the contrast between the internal elements (between the optical module 10 and the mask 11 in particular) of the luminous device 1 will be perceptible to the eye.

At the position P2, the observer O will distinguish the internal elements of the luminous device 1 less well, even if the screen 12 is transparent at the lower part 12b thereof. Indeed, when the observer O is far from the luminous device 1, the internal elements of the luminous device 1 will be smaller in terms of angular size, this corresponding to a larger spatial frequency u, and therefore to a smaller contrast sensitivity S. Thus, the lower part 12b may remain transparent and does not need to have a masking effect like the upper part 12a.

It should be noted that the set of Barten curves is valid for day or night vision.

In one non-limiting embodiment, the optical module 10 is arranged facing the screen 12, such that the light beam Fx passes mainly or entirely through the lower part 12b thereof. It is thus the lower part 12b of the screen 12 that will transmit the light beam F toward the outside of the luminous device 1. The optical performance of the luminous function F is thus not impacted by the masking effect of the upper part 12a described above. The optical performance is thus not degraded, in particular, for regulatory luminous functions whose vertical emission angle is between plus or minus 15° with respect to an axis parallel to the road and passing through the optical module 10.

In order to maintain visibility of the luminous function F in switched-on mode (that is to say the light sources 100 are activated and therefore emit the light rays R1) when close to the motor vehicle 2, in one non-limiting embodiment, it will be preferable to have an upper part 12a that has a partially masking effect and not a totally masking effect. The contrast sensitivity S of the eye is high in this case, thereby making it possible to see the activated luminous function F despite a partial degradation of its optical performance due to the masking upper part 12a. It should be noted that this non-limiting embodiment is used in particular for enhanced luminous functions. In the case of a style luminous function, the performance is not as good. It is therefore possible to have a totally masking upper part 12a.

Of course, the description of the invention is not limited to the embodiments described above and to the field described above. The luminous device 1 may thus furthermore comprise, as internal elements, in addition to the optical module 10 and the mask 11, a set of connection cables for the light sources 100 in order to supply power thereto or else one or more electronic cards used as a support for said light sources 100. Thus, in another non-limiting embodiment, one or more of the primary element 120, secondary element 121 or tertiary element 122 of the embodiments of FIGS. 2 to 3 and 5 to 7 may have a variable thickness, as in the case of the third non-limiting embodiment illustrated in FIG. 4.

The described invention thus has in particular the following advantages:
- it makes it possible to reduce the transmission of the upper part 12a of the screen 12 of the luminous device 1,
- it makes it possible to conceal the internal elements of the luminous device 1 for close observation,
- it makes it possible not to affect the optical performance of said at least one luminous function F carried out by the luminous device 1,
- it is an alternative solution that is less bulky than a mechanical solution that uses a movable shield,
- it is an alternative solution that is less expensive than an electro-optical solution using an LCD screen to mask light Lx in the switched-off mode of the optical module 10.

The invention claimed is:

1. A luminous device for a vehicle, the luminous device being configured to carry out at least one luminous function and comprising at least one optical module and a screen arranged facing the optical module, with the screen including at least two elements that are arranged with respect to one another so as to form an upper part and a lower part of the screen, the upper part being configured to mask ambient light coming from outside the vehicle, and the lower part being configured to transmit the ambient light, and the screen including a primary plastic element and a secondary plastic element that are adjacent along their substantially equal lengths and have variable thicknesses, the thickness of the primary plastic element varying inversely to the thickness of the secondary element, such that the screen has variable transmission for the ambient light, with the secondary element including smoked or opaque plastic material.

2. The luminous device as claimed in claim 1, wherein the optical module is configured to generate a light beam, and the upper part is configured to mask the light beam, and the lower part is configured to transmit the light beam.

3. The luminous device as claimed in claim 2, wherein the optical module is arranged facing the screen, such that the light beam passes mainly through the lower part of the screen.

4. The luminous device as claimed in claim 1, wherein the masking effect of the upper part is partial or total.

5. The luminous device as claimed in claim 1, wherein the screen includes a primary element made of crystal plastic material.

6. The luminous device as claimed in claim 1, further comprising a mask surrounding the optical module.

7. The luminous device as claimed in claim 1, wherein the luminous function is an illumination function, or a signaling function, or a style luminous function, or an enhanced luminous function.

* * * * *